United States Patent
Tamai et al.

[19]

[11] Patent Number: 6,077,192

[45] Date of Patent: Jun. 20, 2000

[54] CONTROL APPARATUS FOR HYDRAULICALLY OPERATED VEHICULAR TRANSMISSION

[75] Inventors: Masaya Tamai; Yasushi Shimizu; Masaru Yamashita, all of Saitama, Japan

[73] Assignee: Honda Giken Kogyo Kabushiki Kaisha, Tokyo, Japan

[21] Appl. No.: 09/354,736

[22] Filed: Jul. 16, 1999

[30] Foreign Application Priority Data

Jul. 21, 1998 [JP] Japan .................................. 10-205534

[51] Int. Cl.[7] .................................................. F16H 61/16
[52] U.S. Cl. .......................................... 477/150; 477/156
[58] Field of Search .................................... 477/150, 156

[56] References Cited

FOREIGN PATENT DOCUMENTS 5-27785  4/1993  Japan .

*Primary Examiner*—Dirk Wright
*Attorney, Agent, or Firm*—Armstrong, Westerman, Hattori, McLeland & Naughton

[57] ABSTRACT

A control apparatus for a hydraulically operated vehicular transmission having a plurality of speed change steps includes a shift valve unit controlling the supplying of hydraulic oil to and discharging of hydraulic oil from hydraulic pressure coupling elements for the respective speed change steps, a throttle hydraulic pressure signal outputting device which outputs a throttle hydraulic pressure signal which is applied to switch the shift valve unit, according to a throttle opening degree of an engine and an accumulator connected to an input oil path through which the throttle hydraulic pressure signal is applied to the shift valve unit.

3 Claims, 4 Drawing Sheets

CONTROL APPARATUS FOR HYDRAULICALLY OPERATED VEHICULAR TRANSMISSION

BACKGROUND OF THE INVENTION

1. Field of the Invention

This invention relates to a control apparatus for a hydraulically operated vehicular transmission which is mounted on automobiles and other vehicles.

2. Description of the Related Art

A control apparatus for a hydraulically operated vehicular transmission has a shift valve unit with controls the supply of hydraulic oil to and the discharging of hydraulic oil form hydraulic pressure coupling elements for the speed change steps of a transmission, so as to selectively establish each of the speed change steps. The shift valve unit is switched according to the predetermined speed change characteristic which is determined with engine throttle opening degrees and vehicle speeds as parameters, to thereby perform an automatic speed changing operation.

Roughly stated, the control apparatuses are divided into ones of electronic control type, and ones of pure hydraulic pressure control type. In the control apparatus of electronic control type, an electromagnetic valve which is controlled by a controller which receives signals from a throttle sensor and a vehicle speed sensor, is used to switch the shift valve unit. The control apparatus of pure hydraulic pressure control type includes: throttle hydraulic pressure signal outputting means for outputting a throttle hydraulic pressure signal according to a throttle opening degree; and vehicle speed hydraulic pressure signal outputting means for outputting a vehicle speed hydraulic pressure signal according to a vehicle speed. In the control apparatus, the shift valve unit is switched according to the throttle hydraulic pressure signal and the vehicle speed hydraulic pressure signal so that the speed change gear stage on the low speed side is established as the throttle hydraulic pressure signal becomes high while the speed change gear stage on the high speed side is established as the vehicle speed hydraulic pressure signal becomes high. Recently, the control apparatus of electronic control type has been popularly employed; however, because of the manufacturing cost, the control apparatus of pure hydraulic pressure control type has been employed, too.

On the other hand, the speed change is carried out in the order of a low speed step, a middle speed step, and a high speed step; however, if the throttle opening degree is abruptly changed, sometimes the speed change is carried out from the low speed step directly to the high speed step skipping the middle speed step. For instance, when the throttle opening degree is abruptly increased, the gear is shifted down from the high speed step directly to the low speed step with skipping from the middle speed step. In addition, when the throttle opening degree is abruptly decreased, the gear is shifted up from the low speed step directly to the high speed step with skipping the middle speed step. If this skipping speed change is carried out, then the shock is liable to occur. Hence, it is desirable that the shift valve unit is switched so that, even if there is occurred a state that the skipping speed change is effected by the abrupt change of the throttle opening degree, the speed change is effected through the middle speed step.

In order to meed this requirement, Japanese Patent Examined Publication No. 27785/1993 has disclosed the following control apparatus of pure hydraulic pressure control type. In the control apparatus there are provided first and second control valves. The first control valve is disposed on a throttle hydraulic pressure signal input oil path coupled to the low-speed—middle-speed shift valve of the shift valve unit and shuts off the above-mentioned input oil path until the hydraulic pressure of a high speed step hydraulic pressure coupling element is decreased to a predetermined value. The second control valve is disposed on a vehicle speed hydraulic pressure signal input oil path coupled to the middle-speed—high-speed shift valve and shut off the above-mentioned input oil path until the hydraulic pressure of a low speed step hydraulic pressure coupling element is decreased to a predetermined value. With the control apparatus, even when the throttle opening degree is abruptly increased, the middle-speed—high-speed shift valve is switched, so that hydraulic oil is discharged from a high speed step hydraulic pressure coupling element, and until the hydraulic pressure is decreased to a predetermined value, the switching of the low-speed—middle-speed shift valve over to the low speed side is prevented by the action of the first control valve. Accordingly, the gear is smoothly shifted down from the high speed step through the middle speed step to the low speed step. On the other hand, even when the throttle opening degree is abruptly decreased, the low-speed—middle-speed shift valve is switched, so that hydraulic oil is discharged from a low speed step hydraulic pressure coupling element, and until the hydraulic pressure is decreased to a predetermined value, the switching of the middle-speed—high-speed shift valve over to the high speed side is prevented by the action of the second control valve. Accordingly, the gear is smoothly shifted up from the low speed step through the middle speed step to the high speed step.

The above-described related control apparatus needs the first control valve for preventing the skipping down shift, and the second control valve for preventing the skipping up shift. Therefore, it is unavoidably complicated in structure.

SUMMARY OF THE INVENTION

In view of the foregoing, an object of the invention is to provide a control device of pure hydraulic pressure control type which is simple in structure, and prevents the skipping down shift and the skipping up shift.

The foregoing object of the invention has been achieved by the provision of a control apparatus for a hydraulically operated vehicular transmission having a plurality of speed change steps, including a shift valve unit which controls the supplying of hydraulic oil to and the discharging of hydraulic oil from the hydraulic pressure coupling elements for the respective speed change steps, a throttle hydraulic pressure signal outputting device which outputs a throttle hydraulic pressure signal which is applied to switch the shift valve unit, according to a throttle opening degree of an engine and an accumulator connected to an input oil path through which the throttle hydraulic pressure signal is applied to the shift valve unit.

With the control apparatus, even if the throttle opening degree is abruptly increased, the hydraulic pressure is stored in the accumulator, so that the throttle hydraulic pressure signal of the input oil path is gently increased, and the shift valve unit is switched from the state that the high speed step is established through the state that the middle speed step is established to the state that the low speed step is established; that is, the skipping down shift from the high speed step directly to the low speed step is prevented. In addition, even if the throttle opening degree is abruptly decreased, hydraulic oil is pushed out of the accumulator, so that the throttle hydraulic pressure signal of the input oil path is gently decreased, and the shift valve unit is switched from the state that the low speed step is established through the state that the middle speed step is established to the state that the high speed step is established; that is, the skipping up shift from the low speed step directly to the high speed step is prevented.

DETAILED DESCRIPTION OF THE PREFERRED EMBODIMENT

Figure 1:
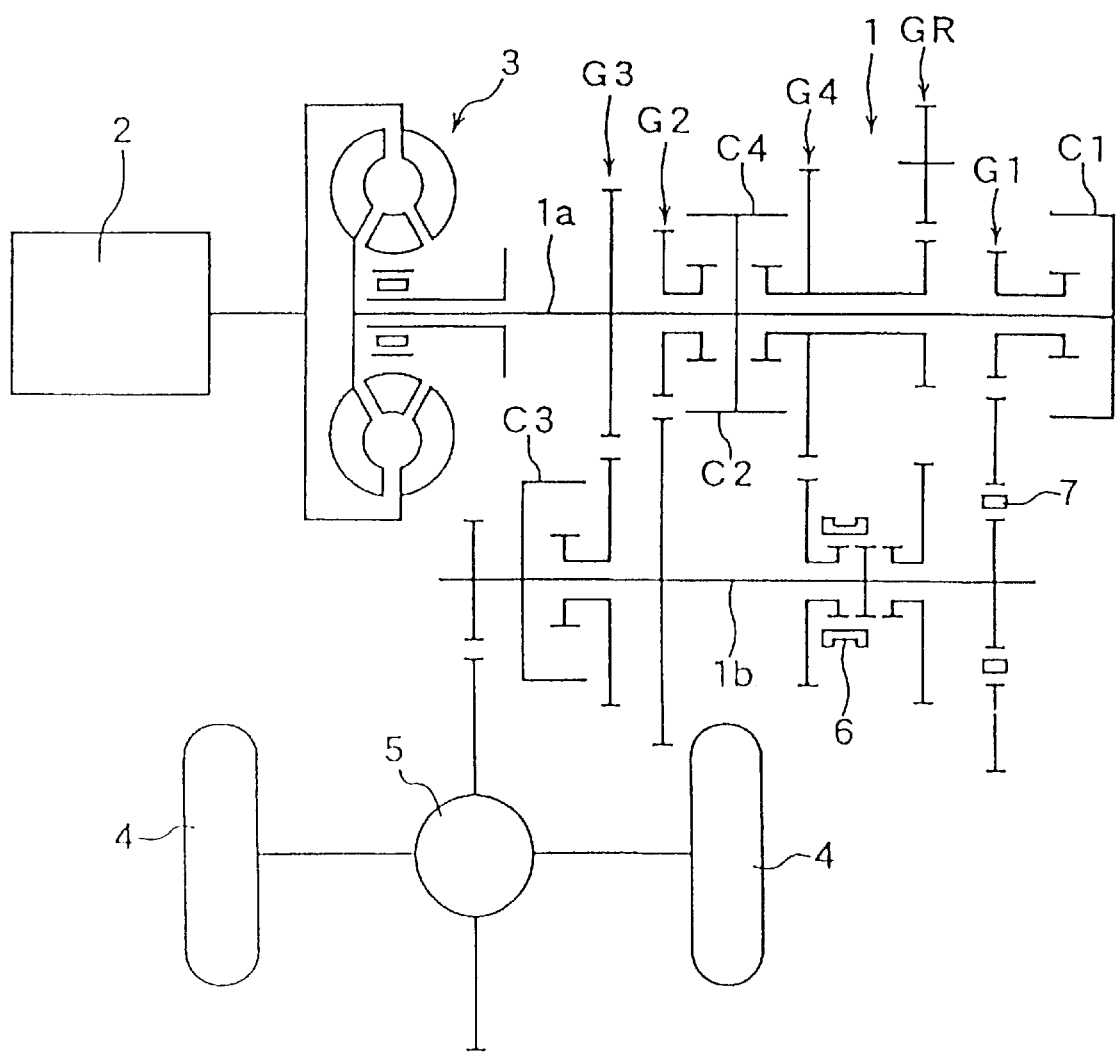
FIG. 1 is a skeleton diagram showing an example of a transmission to which a control device of the invention is applied.

In FIG. 1, reference numeral 1 designates a transmission which performs speed changes—four advance gears and one reverse gear. The transmission 1 has first through fourth advance gear stages G1, G2, G3 and G4 and a reverse gear GR between an input shaft 1a which is coupled through a torque converter 3 to an engine 2 and an output shaft 1b which is coupled through a differential gear 5 to the drive wheels 4 of the vehicle. And hydraulic pressure coupling elements, namely, hydraulic clutches C1, C2, C3 and C4 of first, second, third and fourth speeds are provided for the advance gear change stages G1, G2, G3 and G4, respectively.

The reverse gear change stage GR shares the fourth gear change stage G4 with the fourth speed hydraulic clutch C4, and the fourth gear change stage G4 and the reverse gear change stage GR are selectively established by means of a selector 6 arranged on the output shaft 1b. The first gear change stage G1 is provided with a one-way clutch 7 which allows the output shaft 1b to overrun.

Figure 2:
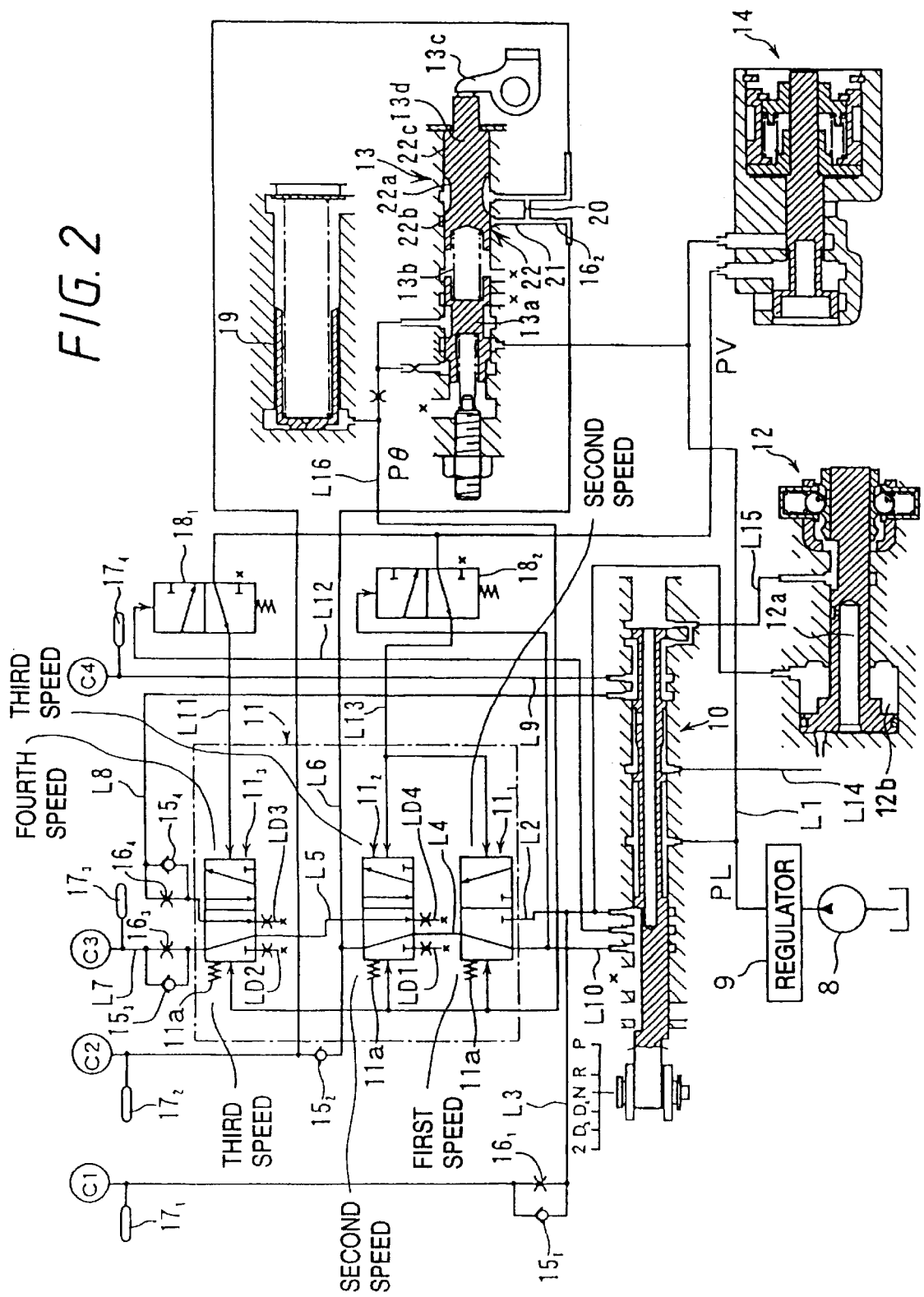
FIG. 2 is a hydraulic pressure circuit diagram showing an example of the control device according to the invention.

The supplying and discharging of hydraulic oil for the hydraulic clutches C1, C2, C3 and C4 are controlled by a hydraulic pressure circuit shown in FIG. 2. The hydraulic pressure circuit includes a hydraulic pressure source 8, a regulator 9, a manual valve 10, a shift valve unit 11, and a servo valve 12 for switching advance and reverse movements which couples to the above-described selector 6.

The manual valve 10 may be changed over to six positions of "P" for parking, "R" for the reverse operation, "N" for the neutral, "$D_4$" for automatic speed change of the first through fourth speeds, "$D_3$" for automatic speed change of the first through fourth speed, and "2" for holding the second speed. At the "$D_4$" position, a first hydraulic oil path L1 adapted to supply hydraulic oil from the hydraulic pressure source 8 whose hydraulic pressure is adjusted to a predetermined line pressure PL by the regulator 9, is connected to a second hydraulic oil path L2 which is coupled to a shift valve unit 11. Hydraulic oil is supplied selectively to the second, third and fourth hydraulic clutches C2, C3 and C4 through the shift valve unit 11, and hydraulic oil is always supplied to the first speed hydraulic clutch C1 through a third hydraulic oil path L3 which branches from the second hydraulic oil path L2.

The shift valve unit 11 includes: a 1-2 shift valve $11_1$ on the upstream side; a 2-3 intermediate shift valve $11_2$ which is connected through a fourth hydraulic oil path L4 to the 1-2 shift valve $11_1$; and a 3-4 shift valve 113 on the downstream side which is connected through a fifth hydraulic oil path L5 to the 2-3 intermediate shift valve $11_2$. And in order to control so as to change over those shift valves $11_1$, $11_2$ and $11_3$ according to the throttle opening degree and the vehicle speed, there is provided a throttle valve 13 which is a throttle hydraulic pressure signal outputting means for outputting a throttle hydraulic pressure signal (hereinafter referred to as "a throttle pressure Pθ", when applicable) according to the throttle opening degree and also there is a governor valve 14 which is a vehicle speed hydraulic pressure signal outputting means for outputting a vehicle speed hydraulic pressure signal (hereinafter referred to as "a governor pressure PV", when applicable) according to the vehicle speed. The shift valves $11_1$, $11_2$ and $11_3$ are pushed to the low speed positions by means of the throttle pressure Pθ and energizing means 11a, and to high speed positions by the governor pressure PV.

At the time of the start at the "D4" position, hydraulic oil is supplied to the first speed hydraulic clutch C1 to establish the first gear change stage G1. Thereafter, the vehicle speed is increased, the 1-2 shift valve $11_1$ is changed over from the low speed position, namely, the first speed position to the high speed position, namely, the second speed position by the governor pressure PV, so that the second hydraulic oil path L2 is connected to the fourth hydraulic oil path L4. Therefore, hydraulic oil is supplied to the second speed hydraulic clutch C2 through the sixth hydraulic oil path L6 on the discharging side of the 2-3 shift valve $11_2$. Thus, the gear is shifted up from the first speed to the second speed. When the vehicle speed is further increased, the 2-3 shift valve $11_2$ is changed over from the low speed position, namely, the second speed position to the high speed position, namely, the third speed position, and the fourth hydraulic oil path L4 is connected to the fifth hydraulic oil path L5. Therefore, hydraulic oil is supplied to the third speed hydraulic clutch C3 through the seventh hydraulic oil path L7 on the discharging side of the third shift valve $11_3$, and the sixth hydraulic oil path L6 is connected through the 2-3 shift valve $11_2$ to a first hydraulic oil discharge path LD1. And, hydraulic oil is discharged from the second speed hydraulic clutch C2. Thus, the gear is shifted up from the second speed to the third speed. When the vehicle speed is further increased, the 3-4 shift valve $11_3$ is changed over from the low speed position, namely, the third speed position to the high speed position, namely, the fourth speed position, and the fifth hydraulic oil path L5 is connected to the eighth hydraulic oil path L8. Therefore, hydraulic oil is supplied to the fourth speed hydraulic clutch C4 through the ninth hydraulic oil path L9 which is connected to the eighth hydraulic oil path L8 at the "$D_4$" position. At the same time, the seventh hydraulic oil path L7 is connected through the 3-4 shift valve $11_3$ to the second hydraulic oil discharge path LD2, so that hydraulic oil is discharged from the third speed hydraulic clutch C4, and the gear is shifted up from the third speed to the fourth speed.

When the vehicle speed is decreased (at the time of deceleration) the 3-4 shift valve $11_3$ is returned to the third speed position, and hydraulic oil is supplied to the third speed hydraulic clutch C3 through the same path as that described above. At the same time, the eighth hydraulic oil path L8 is connected through the 3-4 shift valve $11_3$ to the hydraulic oil discharge path LD3, so that hydraulic oil is discharged from the fourth speed hydraulic clutch C4 and the gear is shifted down from the fourth speed to the third speed. When the vehicle speed is further decreased, the 2-3 shift valve $11_2$ is returned to the second speed position, and hydraulic oil is supplied to the second speed hydraulic clutch C2 through the same path as that described above. At the same time, the fifth hydraulic oil path L5 is connected through 2-3 shift valve $11_2$ to the fourth hydraulic oil discharge path LD4, so that hydraulic oil is discharged from the third speed hydraulic clutch C3 and the gear is shifted down from the third speed to the second speed. When the vehicle speed is further decreased, the 1-2 shift valve $11_1$ is returned to the first speed position, and the fourth hydraulic oil path L4 is connected through 1-2 shift valve $11_1$ to the tenth hydraulic oil path L10 which is opened to the air at the "$D_4$" position. Therefore, hydraulic oil is discharged from the second speed hydraulic clutch C2 and the gear is shifted down from the second speed to the first speed.

Figure 3:
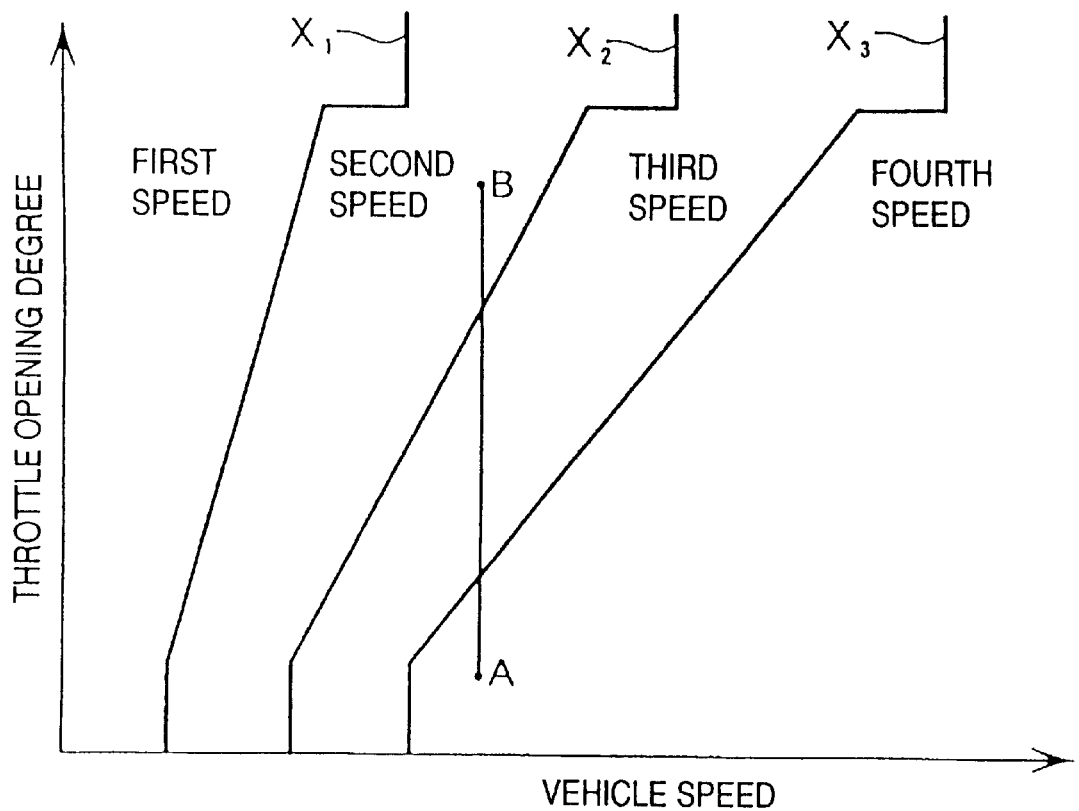
FIG. 3 is a graphical representation indicating speed change characteristics.

Thus, in a speed change characteristic as shown in FIG. 3, the speed is automatically changed between the first speed and the fourth speed is effected. In FIG. 3, reference characters $X_1$, $X_2$, and $X_3$ designate the first speed—second speed, the second speed—third speed, and the third speed—fourth speed speed-change characteristic lines, respectively. In the third hydraulic oil path L3, the sixth hydraulic oil path L6, the seventh hydraulic oil path L7, and the eighth hydraulic oil path L8 which are the hydraulic oil supply paths to the hydraulic clutches C1, C2, C3 and C4 for the first, second, third and fourth speeds, there are intervened hydraulic oil discharging check valves $15_1$, $15_2$, $15_3$ and $15_4$ and hydraulic oil supplying orifices $16_1$, $16_2$, $16_3$ and $16_4$ connected in parallel to the aforementioned hydraulic oil discharging check valves. In addition, there are connected accumulators $17_1$, $17_2$, $17_3$ and $17_4$ which absorb the abrupt hydraulic pressure changes of the hydraulic clutches C1, C2, C3 and C4, respectively.

In an eleventh hydraulic oil path L11 for inputting the governor pressure PV from the governor valve 14 to the 3-4 shift valve $11_3$, there is provided a first cut off valve $18_1$ which is closed by the hydraulic pressure of a twelfth hydraulic oil path L12 which is connected to the first hydraulic oil path L1 at the "$D_3$" position. Hence, at the "$D_3$" position, the inputting of the governor pressure to the 3-4 shift valve $11_3$ is suspended, and the 3-4 shift valve 113 is held at the third speed position, so that the automatic speed change of from the first speed to the third speed is effected.

In a thirteenth hydraulic oil path L13 for inputting the governor pressure PV to the 1-2 shift valve $11_3$ and the 2-3 shift valve $11_2$, there is provided a second cut off valve $18_2$ which is closed by the hydraulic pressure from the tenth hydraulic oil path L10. Hence, at the "2" position, the inputting of the governor pressure to the 1-2 shift valve $11_1$ and the 2-3 shift valve $11_2$ is suspended, and the 1-2 shift valve $11_1$ is held at the first speed position while the 2-3 shift valve $11_2$ is held at the second valve position, so that hydraulic oil is supplied from the tenth hydraulic oil path L10 through the fourth hydraulic oil path L4 and the sixth hydraulic oil path L6 to the second speed hydraulic clutch C2 and the gear is held in the second speed.

At the "R" position, a fourteenth hydraulic oil path L14 provided on the input side of the servo valve 12 is connected to the first hydraulic oil path L1, and a ninth hydraulic oil path L9 connected to the fourth speed hydraulic clutch C4 is connected to a fifteenth hydraulic oil path L15 provided on the output side of the servo valve 12. And, by the hydraulic pressure from the fourteenth hydraulic oil path L14, the servo valve 12 is switched over to the reverse movement position (on the right of the drawing), and the reverse gear change stage GR is coupled through the selector 6 to the output shaft 1b. And, at the reverse movement position the fourteenth hydraulic oil path L14 is connected through an hydraulic oil hole 12a (formed in the servo valve 12) to the fifteenth hydraulic oil path L15, so that hydraulic oil is supplied to the fourth speed hydraulic clutch C4 and the reverse gear change stage GR is established.

At the "$D_4$", "$D_3$" or "2" position, hydraulic pressure from the second hydraulic oil path L2, is applied to the back pressure chamber 12b of the servo valve 12, so that the servo valve 12 is switched over to the advance movement position (as shown in the drawing), and the fourth gear change stage G4 is coupled through the selector 6 to the output shaft 1b.

If, during the fourth speed traveling with the point A in FIG. 3 at the "$D_4$" position, the throttle opening degree is abruptly increased so that the shift is made from the point A to the point B, then substantially at the same time when the 3-4 shift valve $11_3$ is switched to the third speed position, the 2-3 shift valve $11_2$ is switched over to the second speed position. Thus, the gear is shifted down from the fourth speed to the second speed neglecting the third speed may be effected, that is, skipping the third speed. Further, during the second speed traveling with the point B, if the throttle opening degree is abruptly decreased, and the point B is shifted to the point A, then substantially at the same time when the 2-3 shift valve $11_2$ is switched over to the third speed position, the 3-4 shift valve $11_3$ is switched over to the fourth position. Thus, the gear is shifted up from the second speed to the fourth speed neglecting the third speed may be effected, that is, skipping the third speed. And if the above-described speed change skipping operation is carried out, a great shock may occur.

Figure 4:
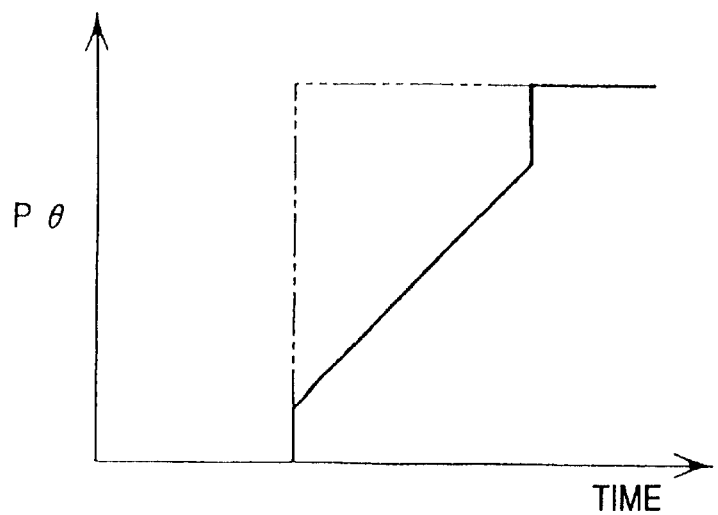
FIG. 4 is a graphical representation showing variations in throttle pressure indicated when the throttle opening degree is abruptly increased.
Figure 5:
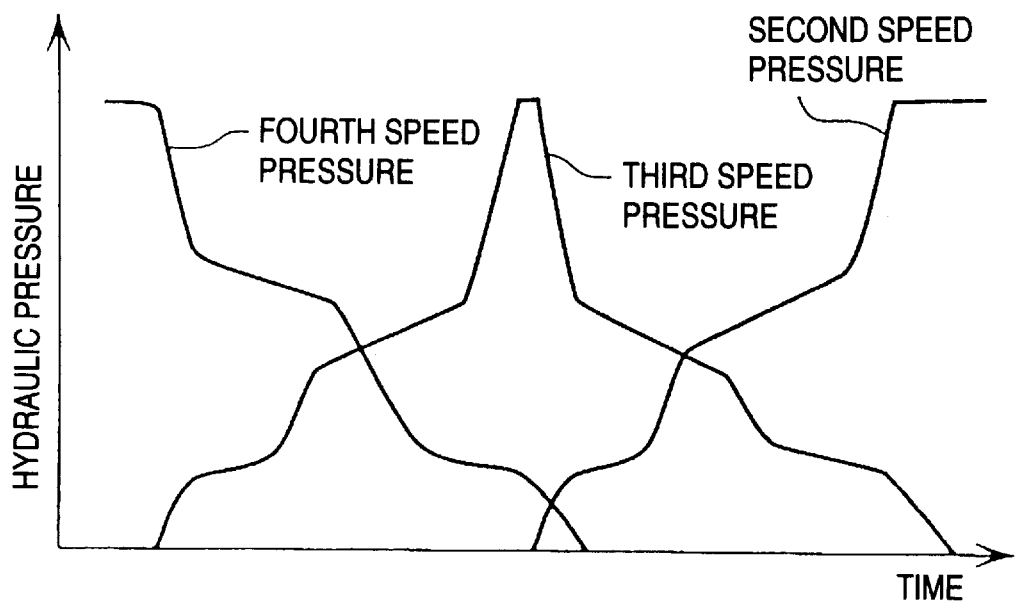
FIG. 5 is a graphical representation indicating hydraulic pressure variations in hydraulic clutches at the 4-2 down shift time; and, FIG. 6A and 6B are views each showing a specific structure of the accumulator according to the invention.

Hence, in the embodiment, the accumulator 19 is connected to the sixteenth hydraulic oil path L16 adapted to input the throttle pressure Pθ to the shift valves $11_1$, $11_2$ and $11_3$, so that the abrupt change of the throttle pressure Pθ which is due to the aburpt change of the throttle opening degree can be eased. According to this structure, even if the shift is made from the point A to the point B shown in FIG. 3 because of the abrupt increase of the throttle opening degree, and the output hydraulic pressure of the throttle valve 13 is abruptly increased as indicated by the phantom line in FIG. 4, the throttle pressure Pθ applied through the sixteenth hydraulic oil path L16 to the shift valves $11_1$, $11_2$ and $11_3$ is moderately increased as indicated by the solid line in FIG. 4 because of the pressure storing action of the accumulator 19, so that, with a time lag after the third shift valve $11_3$ is switched over to the third speed position, the second shift valve $11_2$ is switched over to the second speed position. And, during this time lag, as shown in FIG. 5 the decrease of the hydraulic pressure of the fourth speed hydraulic clutch C4 (the fourth speed pressure) and the increase of the hydraulic pressure of the third speed hydraulic clutch C3 (the third speed pressure) which are due to the switching of the third shift valve $11_3$ to the third speed position are effected, so that the gear is shifted down to the third speed. Thus, the skipping down shift from the fourth speed directly to the second speed is prevented. When the shift is made from the point B to the point A shown in FIG. 3, the throttle pressure Pθ applied to the shift valves $11_1$, $11_2$ and $11_3$ is moderately decreased as the hydraulic oil is pushed out of the accumulator 19. Therefore, with a time lag after the second shift valve $11_2$ is switched over to the third speed position, the third shift valve $11_3$ is switched over to the fourth speed position. Thus, similarly as in the above-described case, the skipping up shift from the second speed directly to the fourth speed is prevented. At the time of the kick-down from the third speed to the second speed, a time lag occurs to an extent; however, this time lag effectively functions for the speed change after the output of the engine is stabilized; that is the speed change shock is eased.

Figure 6:
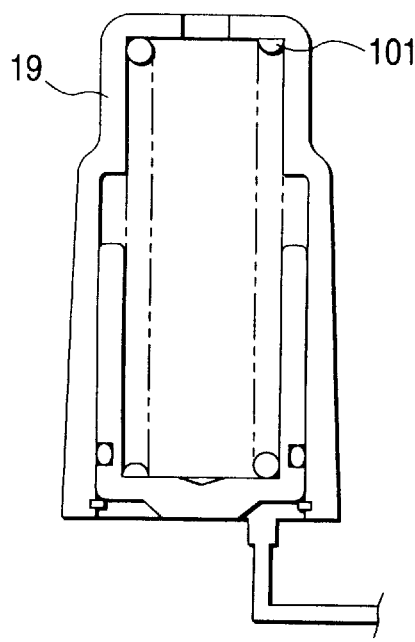
Figure 6:
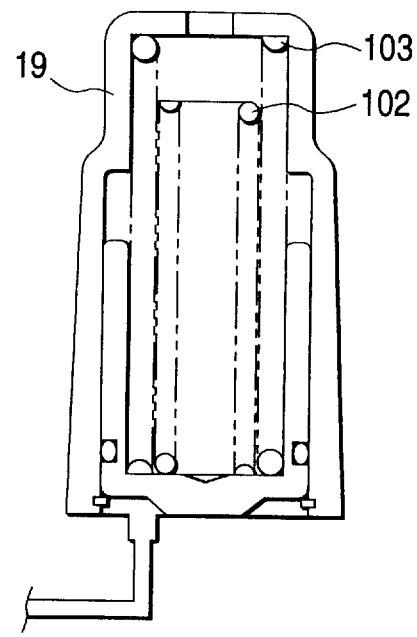

The accumulator 19 is constructed with a spring 101, as shown in FIG. 6A. With this structure, the accumulator 19 can correspond to various transmissions by changing spring constant of the spring 101, that is, applying various springs different in spring constant to the spring 101. Further, the accumulator 19 may be constructed with two springs of an inner spring 102 and an outer spring 103, as shown in FIG. 6B. With this structure, the accumulator 19 can be set so as to have a further high degree of freedom by changeing spring constant each of the inner and outer springs 102, 103, and the length thereof.

The speed change between the first gear change stage G1 provided with the one-way clutch 7 and other gear change stages is smoothly achieved owning to the action of the one-way clutch 7. However, when, to the gear change stage not employing the one-way clutch, the down shift is effected by decreasing the speed when the acceleration pedal is returned, or by the kick down when the acceleration pedal is stepped on, the shock is liable to occur. This tendency is significant with the second speed gear which is the lowest gear change stage empolying no one-way clutch. That is, if, when the down shift is effected by decreasing the speed when the acceleration pedal is returned, the second speed hydraulic oil clutch C2 is abruptly coupled, the second speed gear is established before the speed of the engine is sufficiently increased, so that the drive torque of the drive wheels 4 is decreased, and a so-called "acceleration pedal return shock" occurs. Furthermore, if, in the case where the down shift to the second speed is effected by the kick down, the second speed hydraulic clutch C2 is abruptly coupled, then the drive torque is quickly increased, and a so-called "kick down shock" occurs.

Therefore, in the embodiment, in the sixth hydraulic oil path L6 which is the hydraulic oil supplying path to the second speed hydraulic clutch C2, a sub-orifice 20 is interposed on the downstream side of a main-orifice $16_2$ which operates at all times, and a bypass path 21 for bypassing the orifice 20 is provided. In addition, an opening and closing valve (switching valve) 22 is provided to communicate with and shut off the bypass path 21. The switching valve 22 shuts off the bypass path 21 at the time of a low opening degree in which the throttle opening degree is lower than a first predetermined value (for instance "⅛ opening degree") with which the acceleration pedal return shock is liable to occur, and at the time of a high opening degree in which the throttle opening degree is higher than a second predetermined value (for instance "⅞ opening degree") with which the kick down shock is liable to occur, and thus, the sub-orifice 20 is operated.

The switching valve 22 is formed integral with a throttle plunger 13d which is a movable member which changes the energizing force of a spring 13b according to the movement of a throttle lever 13c operating in association with the throttle. The spring 13b pushes the spool 13a of the throttle valve 13 towards the open side (to the left in FIG. 2). That is, the throttle plunger 13d is provided with an annular groove 22a which opens the bypass path 21 when the throttle opening degree is a middle value between the first predetermined value and the second predetermined value. And, at the time of the low opening degree, the bypass path 21 is shut off with a land 22b on one side (the left side in FIG. 2) to the annular groove 22a. Further, at the time of the high opening degree, the bypass path 21 is shut off with the land 22c on the other side (the right side in FIG. 2) to the annular groove 22a.

Hence, when the gear is shifted down to the second speed by the deceleration due to the acceleration pedal returning operation, and when the gear is shifted down to the second speed is effected by the kick down, in addition to the main orifice $16_2$, the sub-orifice 20 acts. As a result, the hydraulic pressure of the second speed hydraulic clutch C2 is increased more moderately than in the normal case, so that the second speed hydraulic clutch C2 is gradually coupled; that is, the acceleration pedal return shock, and the kick down shock are eased.

The embodiment in which the technical concept of the invention is applied to the control apparatus for the biaxial parallel transmission has been described; however, it goes without saying that the technical concept of the invention is applicable to a control apparatus for a planet gear type transmission.

As is apparent from the above description, according to the invention, the skipping down shift and the skipping up shift can be prevented with one and the same accumulator. Hence, the control apparatus of the invention is simple in structure and accordingly low in manufacturing cost.

The present disclosure relates to the subject matter contained in Japanese patent application No. Hei. 10-205534 filed on Jul. 21, 1998 which is expressly incorporated herein by reference in its entirety.

While only certain embodiments of the invention have been specifically described herein, it will apparent that numerous modifications may be thereto without departing from the spirit and scope of the invention.

What is claimed is:

1. A control apparatus for a hydraulically operated vehicular transmission having a plurality of speed change steps, comprising:

a shift valve unit controlling the supplying of hydraulic oil to and the discharging of hydraulic oil from hydraulic pressure coupling elements for said respective speed changed steps;

a throttle hydraulic pressure signal outputting device which outputs a throttle hydraulic pressure signal according to a throttle opening degree of an engine, said throttle hydraulic pressure signal being applied to switch said shift valve unit; and an accumulator connected to an input oil path through which said throttle hydraulic pressure signal is applied to said shift valve unit.

2. A control apparatus according to claim 1, wherein said accumulator includes a spring having a predetermined spring constant.

3. A control apparatus according to claim 1, wherein said accumulator includes an inner spring and an outer spring which are accommodated therein and disposed parallel to each other.

* * * * *